United States Patent [19]
Pearson

[11] 3,872,756
[45] Mar. 25, 1975

[54] RAKE ANGLE AND RELATED STROKE CONTROL FOR A SHEAR OR THE LIKE

[75] Inventor: Eugene W. Pearson, Orinda, Calif.
[73] Assignee: Canron, Inc., Oakland, Calif.
[22] Filed: June 18, 1973
[21] Appl. No.: 371,069

[52] U.S. Cl................. 83/522, 83/530, 83/624, 83/636
[51] Int. Cl................................. B26d 7/26
[58] Field of Search............ 83/522, 529, 530, 626, 83/636, 640, 641, 639, 624

[56] References Cited
UNITED STATES PATENTS

| | | | |
|---|---|---|---|
| 2,931,182 | 4/1960 | Anderson et al.............. | 83/624 UX |
| 3,152,503 | 10/1964 | Pearson........................... | 83/639 X |
| 3,183,756 | 5/1965 | Dehn................................ | 83/530 |
| 3,282,141 | 11/1966 | Gautron.......................... | 83/640 X |
| 3,568,558 | 3/1971 | Passa............................... | 83/530 |

Primary Examiner—J. M. Meister

[57] ABSTRACT

A rake angle and related stroke control for a machine such as a shear or the like is disclosed. The machine includes a pair of angularly relatable tool components, such as a movable ram and a tool support or blade, and means for adjusting the angular relationship between the tool components, preferably by adjusting the rake angle of the movable ram. A rake angle control which is uniquely formed and mounted to sense and control the rake angle of the ram is provided. In addition, the machine is formed with stroke adjustment means for determining the extent of cooperation between the tool components; and relating means, preferably graphical means, for associating the stroke adjustment means to the rake angle adjustment is also provided to obtain the desired extent, usually length, of cooperation between the tool components at any desired rake angle.

5 Claims, 9 Drawing Figures

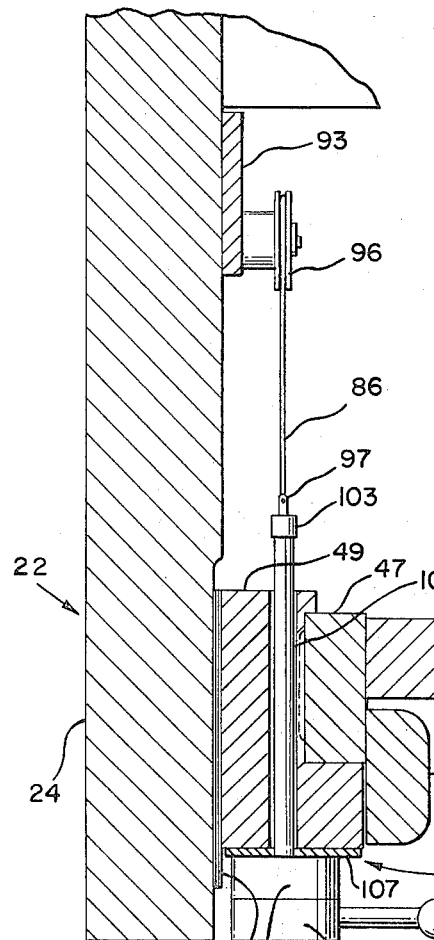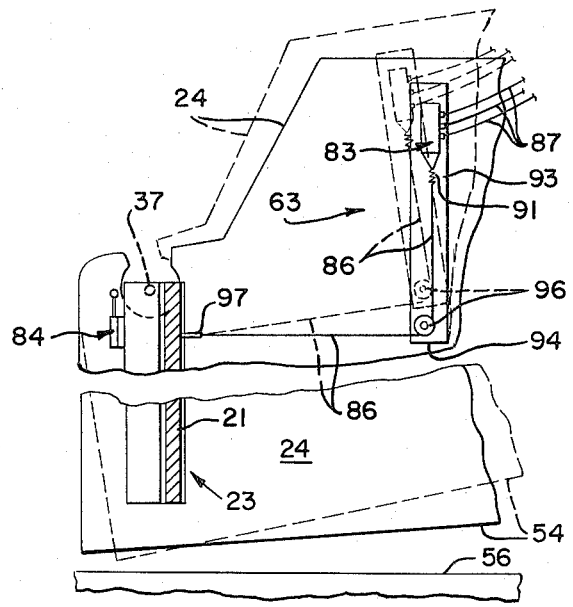
FIG. 9
FIG. 4
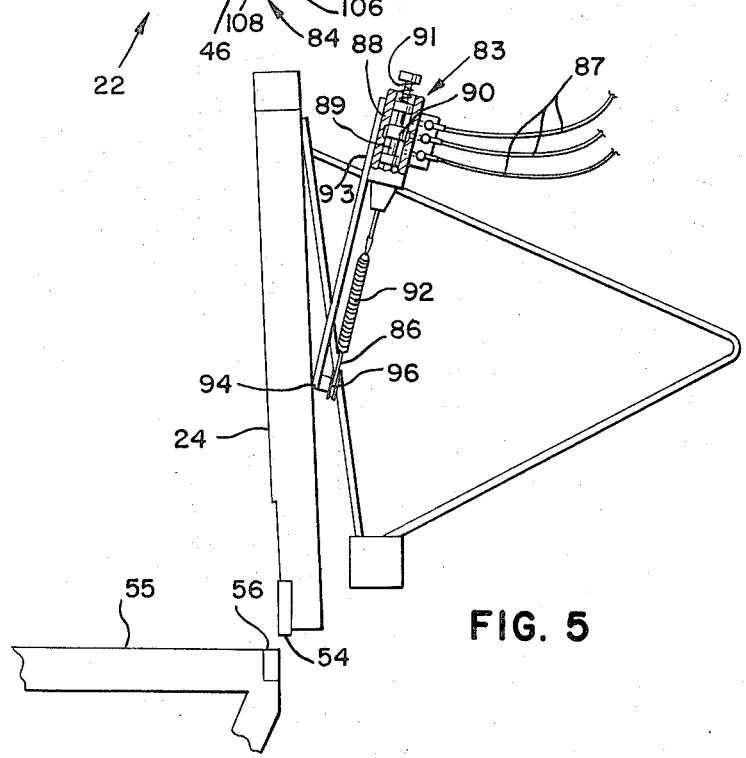
FIG. 5

3,872,756

RAKE ANGLE AND RELATED STROKE CONTROL FOR A SHEAR OR THE LIKE

In recent years the advantages which accrue from being able to adjust the rake angle and length of stroke of a machine such as a shear having a movable ram and a fixed blade have become recognized. While advantages in terms of capacity and versatility accrue from being able to adjust the rake angle and stroke of a shearing machine, it is essential, if these advantages are to be fully utilized, that the control mechanisms for these adjustments be accurate and easy to use. Moreover, further substantial advantage results by being able to accurately and conveniently interrelate the adjustment of rake angle and stroke control to obtain a desired degree of cooperation between the movable blade on the ram and the fixed blade.

Accordingly, among the objects of my invention are:
1. To provide a novel and improved shear machine;
2. To provide a novel and improved rake angle and related stroke control for a shear machine for coordination of the rake angle and stroke for maximum output and efficiency;
3. To provide a novel and improved rake angle control for a shear machine and the like;
4. To provide a novel and improved stroke control for a shear machine and the like;
5. To provide a novel and improved shear machine having means for coordinating the length of cut of the shear blade to the angle of the blade.

Additional objects of my invention will be brought out in the following description of a preferred embodiment of the same taken in conjunction with the accompanying drawings, wherein:

FIG. 3 is a fragmentary view in section of a ram mount taken substantially along the plane of line 3—3 in FIG. 1;

FIG. 4 is a fragmentary view in section of the rake angle control taken substantially along the plane of line 4—4 of FIG. 2;

FIG. 5 is a reduced view in end elevation of the ram and fixed blade of the shear machine of the present invention;

FIG. 9 is a fragmentary rear view in elevation of the ram showing adjustment in rake angle by the control of the present invention.

Figure 1:
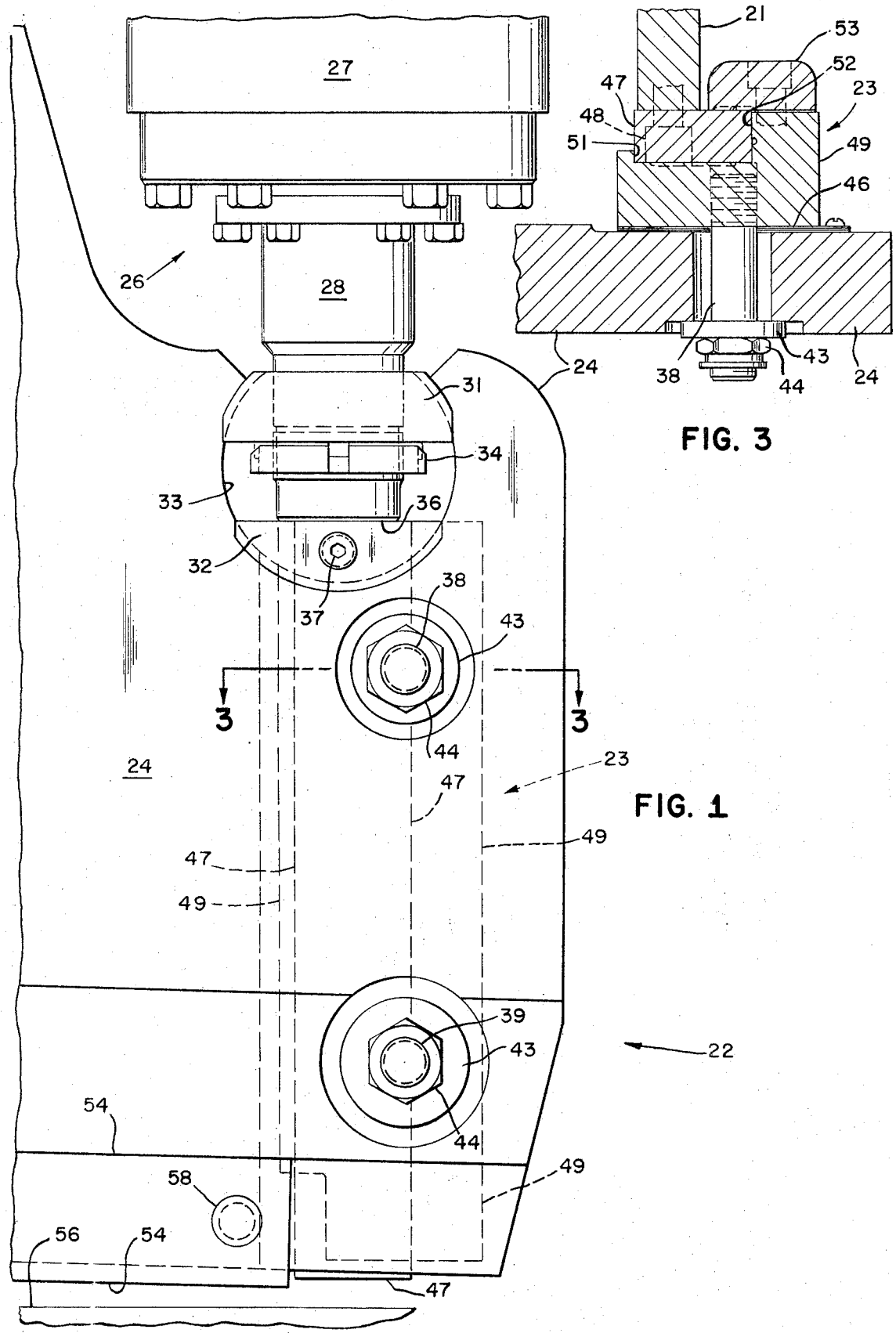
FIG. 1 is a fragmentary front view in elevation of the right-hand end of the ram of a shear machine embodying the present invention.

Referring to the drawing for details of my invention in its preferred form, the same is shown incorporated into a hydraulically powered shear machine having a frame 21 to which a ram assembly, generally designated 22, is slidably supported, preferably for vertical reciprocation. While the invention is applicable in general to machines having cooperative tool components for operation on work, it is particularly suited for application to machines of the shear machine type having a fixed lower blade and a movable upper blade and will be described in connection with such shear machine. The overall construction of a shear machine suitable for use with the rake angle and related stroke control of the present invention is shown in my previous U.S. Pat. No. 3,181,407, issued May 4, 1965.

Ram assembly 22 includes slide means, generally designated 23, and a ram 24 mounted to the slide means for selective angular displacement to effect an adjustment of the rake angle of ram 24. Drive means, preferably in the form of a pair of motors or power cylinders 27, having piston rods 28 pivotally coupled to ram 24, are provided to slidably move the ram assembly with respect to frame 21. As shown herein, power cylinders 27 are pivotally coupled to ram 24 substantially as is shown and set forth in detail in connection with my previous U.S. Pat. No. 3,163,105, issued Dec. 29, 1964, and such pivotal connection will only be briefly described herein.

A pair of upper and lower saddle-shaped bearing blocks 31 and 32 are mounted in circular opening 33 of ram 24. Carried on the end of piston rod 28 is a nut or collar 34 which engages bearing block 31, and the end surface 36 of piston rod 28 engages and bears upon bearing block 32. As best may be seen in FIG. 2, bearing block 32 is secured by a pin or dowel 37 to slide means 23 so as to enable pivoting of ram 24 about dowel 37 with the two saddle-shaped bearing blocks maintained in engagement with cavity 33 of ram 24.

In order to further connect ram 24 to slide means 23 for guided reciprocation, a pair of studs 38 and 39 extend from slide means 23 outwardly through enlarged openings 41 and 42 through ram 24 and have washers 43 and nuts 44 mounted thereon. Interposed between ram 24 and slide means 23 adjacent openings 41 and 42 are shims 46, of Teflon or lubricated discs. As will be seen, the relatively large openings 41 and 42 allow studs 38 and 39 room to move as the ram is pivoted about dowel 37. Thus, while slide assembly 23 is mounted in fixed angular relation to frame 21, it is possible to angularly adjust ram 24 with respect to the slide assembly while maintaining the power cylinders coupled to drive the ram as guided by slide means 23.

Since preferably there are a pair of power cylinders 27, each coupled in the manner described to the ram, it is possible to effect adjustment of the rake angle by holding one of the power cylinders in a fixed position and raising or lowering the remaining cylinder to angularly displace the ram about dowel 37. Once the desired angular displacement in achieved, the rake angle may be maintained while both cylinders are driven in unison in performing an operation on a workpiece.

The details of construction of slide means 23 and its mounting to frame 21 can best be seen in FIG. 3 wherein frame 21 is formed with a vertically extending guideway 47 fixedly secured to the remainder of frame 21 by a fastener 48 or the like. Slide means 23 includes a main body portion 49 formed with longitudinally extending surfaces 51 and 52 which engage oppositely facing surfaces on guideway 47, and a longitudinally extending member 53, which is bolted to main body 49 and clamps slide means 49 to the guideway mounted on frame 21. Thus, slide means 23 is clamped to vetically extending guide member 47 for guided vertical reciprocation of ram 24 with respect to the frame of the shear.

Carried by ram 24 along the lower edge thereof is a movable blade 54 which cooperates with fixed blade 56 on table 57 to perform an operation on a workpiece, usually shearing of the same. Movable blade 54 is rigidly secured to ram 24 by fastener 58, which is normally not employed to effect changes in the rake angle, but instead to enable replacement of this blade.

The expression "rake angle" as used herein shall normally mean the angle at which blade 54 is skewed along its length from a position at which it would simultaneously engage fixed blade 56 over the entire length of the fixed blade. In the shear machine illustrated, this would be a horizontal plane; however, it will be understood that the apparatus of the present invention would be equally applicable to shears in which both the fixed and movable blades are inclined to the horizontal or in which the ram reciprocates in a generally horizontal plane instead of a generally vertical plane.

For most efficient operation in terms of power and time, it is highly desirable and advantageous to adjust the rake angle of the shear so as to maximize the cutting efficiency and further to adjust the length of stroke to provide the minimum stroke required to sever or cut the workpiece to the desired degree. Means have been provided in previous machines for adjusting the angular relationship between the blade, namely, by adjusting the rake angle of the ram and the movable blade, and such machines have further been provided with means for adjusting the length of the stroke of the ram during vertical reciprocation. For example, the shear machine set forth in my afore-mentioned U.S. Pat. No. 3,181,407, shows both types of adjustments (see particularly FIGS. 2 and 3). While such apparatus have been found to be highly advantageous, it is a feature of the present invention to provide an improved rake angle control and relating means for associating the stroke adjustment to the angular adjustment in order to obtain a predetermined extent of cooperation between the fixed and movable blades.

Figure 2:
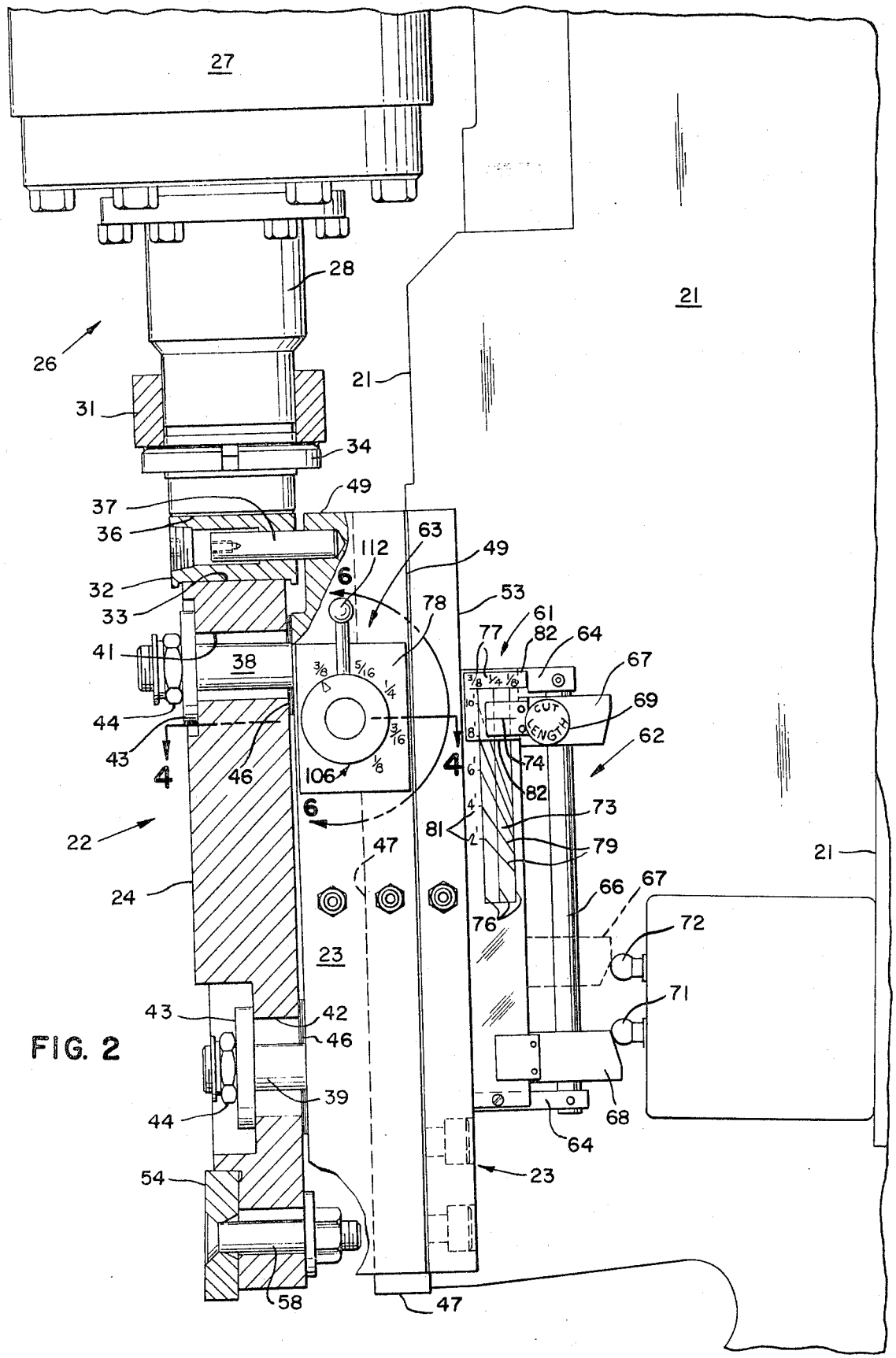
FIG. 2 is a fragmentary view in end elevation and in section of the ram of the machine of FIG. 1.
Figure 6:
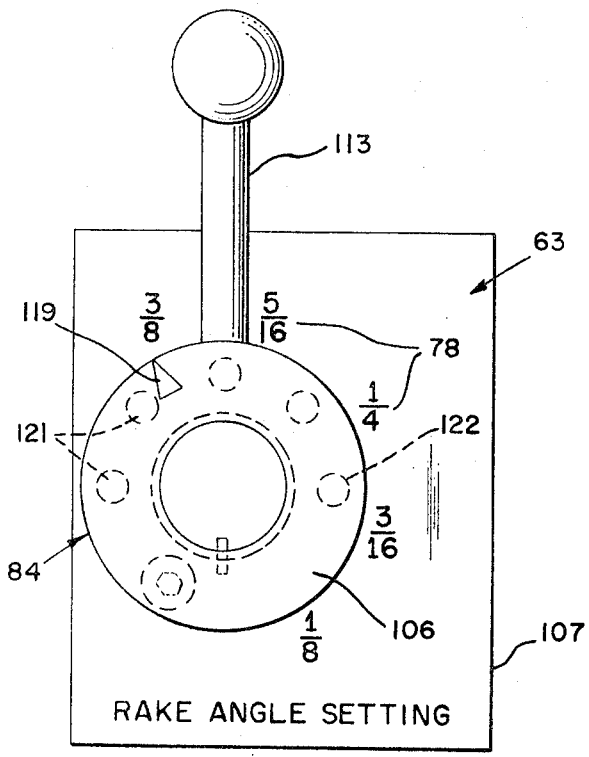
FIG. 6 is an enlarged view of the rake angle control apparatus shown in FIG. 2.
Figure 8:
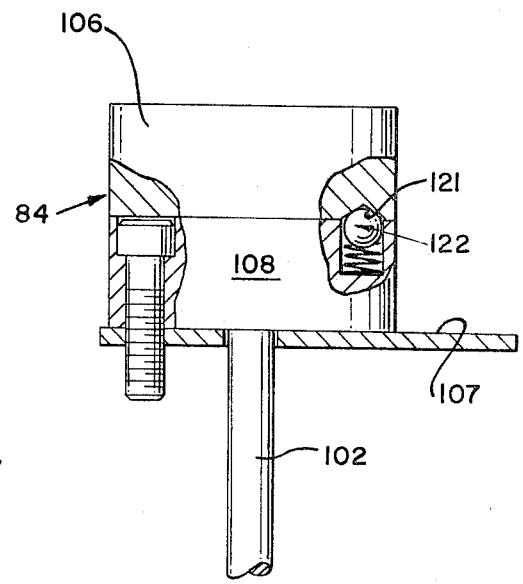
FIG. 8 is an underside view partially in section of the rake angle control of FIG. 6.
Figure 7:
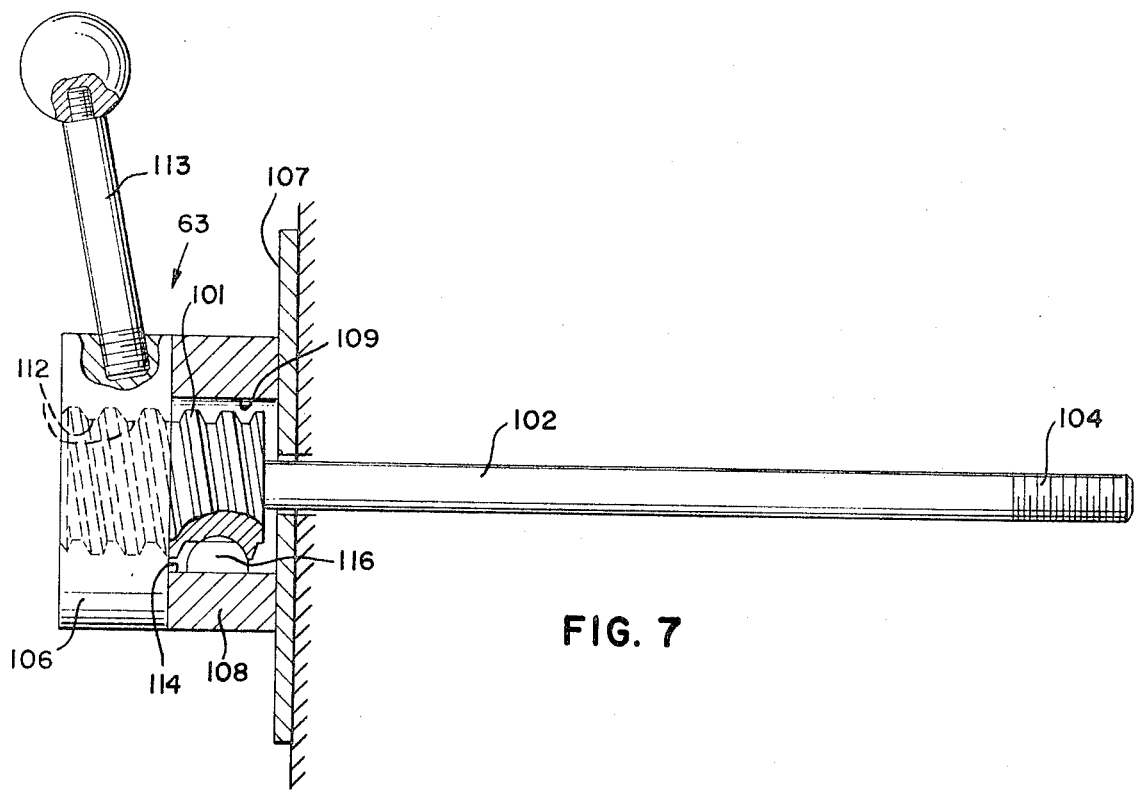
FIG. 7 is a side elevational view partially in section of the rake angle control of FIG. 6.

As best may be seen in FIG. 2, relating means, generally designated 61, is mounted proximate to the stroke adjustment means, generally designated 62, and to the means, generally designated 63, for adjusting the rake angle of ram 24 and movable blade 54.

In order to determined the length of stroke or vertical reciprocation of ram 24, stroke adjustment means 62 preferably is formed as a bracket having end members 64 secured to slide member 53 and carrying a vertically extending post 66. Movably mounted on post 66 are upper and lower adjustable stops 67 and 68, both of which are formed for selective securement, as by thumb screw 69, to post 66 at any predetermined position therealong.

Mounted to frame 21 at a predetermined position are microswitches or limit switches 71 and 72, which microswitches, in conjunction with associated stops 67 and 68, serve as stroke adjustment means for controlling the vertical movement of ram 24. Thus, since bracket 64 moves with slide means 23 and ram 24, and since microswitches 71 and 72 are stationary, reciprocation of the ram can be controlled, first in limiting the upward movement of the ram by engagement of lower stop 68 with microswitch 71, and then by ceasing the downward movement of the ram upon engagement of microswitch 72 by stop 67.

Adjustment to the rake angle of the ram will result in a substantial difference in the length of cut or extent of cooperation between the fixed and movable blades. This is particularly true since the angle between the fixed and movable blade is usually a relatively small angle. Thus, a given setting for upper stop 67 will produce cuts of widely varying length as the rake angle of ram 64 is adjusted by rake angle control means 63.

In order to control the length of cut and be certain that it is no longer than is necessary for the workpiece being sheared, relating means 61 is preferably formed to include graphical means 73 mounted in proximity to the stroke control adjustment means 62, in this case mounted on bracket end members 64. Additionally, carried by upper adjustable stop 67 is an indicator 74 which is formed to extend for movement over graphical means 73 to indicate the prevailing extent of cooperation, or length of cut, between the fixed and movable blades for any given rake angle. Graphical means 73 is formed to graphically represent the length of cooperation of the tool components as a function of rake angle. Thus, graphical means 73 is formed with vertically extending lines 76 which represent rake angle settings and are marked with indicia 77 corresponding to the indicia 78 on the rake angle control means. Sloping lines 79 cross over and intersect with lines 76 and represent the length of cut or extent of cooperation between the fixed and movable blades for any rake angle. Indicia 81 set forth the length of cut represented by sloping lines 79. It should be noted further that indicia 77 are formed on a member 82 which is mounted to slide 23 by brackets 64 with respect to which stop adjustments may be made.

In operation, rake angle adjustment means 63 is adjusted to the desired rake angle of the ram to produce maximum efficiency in shearing the workpiece in accordance with the thickness and type of material being sheared. Next, adjustable stop 67 is moved along post 66 until indicator 74 is superimposed over or adjacent to the intersection between the vertical rake angle line 76 corresponding to the rake angle setting and the sloping line 79 corresponding to the length of the piece being sheared. As seen in FIG. 2, the rake angle is positioned at the 3/8 setting and adjustable stop 67 is set to cut a workpiece approximately 9 feet in length. As will be seen from the graphical means, some interpolation between the lines is required, but can be rapidly and easily accomplished. Further vertical and sloping lines could be provided, but would tend to complicate reading of the graphical means. Moreover, it is normally not necessary to set the length of cut with exact precision, but rather to avoid a stroke which would produce an 8 foot long cut when a 4 foot long workpiece is to be sheared.

While a rake angle control means of the type shown in my previously issued U.S. Pat. Nos. 3,145,602 and 3,181,407 would be entirely suitable for use in the present invention, I have in the present application provided improved rake angle control means. Referring to FIGS. 4 and 5, the rake angle control means, generally designated 63, can be seen to include a valve assembly 83, cable tensioning and relaxing means, generally designated 84, and cable means 86 coupling valve assembly 83 to tensioning and relaxing means 84. Rake angle control 63 is mounted on ram assembly 22 and coupled at one point, preferably at valve assembly 83, to ram 24 and at another point, preferably at tensioning and relaxing means 84, to slide means 23, with cable 86 following a path which changes in length in response to angular displacement of ram 24.

In order to effect and control angular displacement of ram 24, valve assembly 83 is preferably a hydraulic valve of the servo-valve type which may be connected, as by fluid conduits 87, to power cylinders 27 through any appropriate hydraulic control system. A valve and associated hydraulic system of the type suitable for use in the rake angle control of the present invention is disclosed in the patent issued to Rolland A. Richardson for "Ram Attitude Control System," U.S. Pat. No. 3,349,669 of Oct. 31, 1967, and is used as a basis for the disclosure of the present invention.

Thus, valve 83 is preferably a servo valve including a housing 88, a valve 89 mounted in the housing for movement to one side or the other of an intermediate position 90, and means 91 normally applying a biasing force to the valve. Cable means 86 is connected to valve 89; and cable tensioning and relaxing means 84, when adjusted in one direction, will apply a tension force to valve 89 and when adjusted in the opposite direction, will permit biasing means 91 to shift the valve in the opposite direction. Thus, a tension force applied to the cable will pull the servo valve in a direction which will cause at least one of the power cylinders to displace the ram with respect to slide means 23. Relaxing the cable will allow the biasing means 91 in valve assembly 83 to displace valve 89 past intermediate position 90 in the opposite direction. Thus, rake angle adjustments in either direction are provided for. It should be noted further that cable means 86 may include an overload spring 92 which does not effect normal operation but merely protects against overload on the cable.

Operation of the ram attitude control can best be understood by referring to FIG. 9 wherein the ram is shown in solid lines before adjustment of the rake angle control and in dotted lines after the rake angle adjustment. It should be noted that the change in rake angle has been exaggerated in FIG. 9 for the purpose of ease of understanding.

In the example shown, cable tensioning and relaxing means 84 has been adjusted to relax cable 86 and allow the spring biased valve to move away from intermediate position 90 in a direction causing lifting of the power cylinder at the opposite end of the ram. The power cylinder adjacent the ram attitude control apparatus is immobilized, causing ram 24 to pivot about dowel 37 adjacent the rake angle control. Since slide means 23 is mounted to the frame, the slide means is also immovable while the ram is being rotated about dowel 37.

Valve assembly 83 is mounted to a bracket 93 which is secured at its inner end 94 to ram 24. Additionally, it is preferable that a guide, in this case pulley means 96, be mounted adjacent end 94 of bracket 93 and have cable 86 carried thereby. Thus, as ram 24 is angularly displaced about dowel 37, bracket 93 carrying valve assembly 83 and guide pulley 96 is similarly displaced with the ram. The distance in the moved position between guide 96 and valve assembly 83 is exactly the same as it was before angular displacement. Since slide means 23 did not move during angular displacement, however, the distance between guide pulley 96 and the end of the cable at 97, as secured to the cable tensioning and relaxing means, has changed, namely, the distance between 97 and 96 has increased slightly in the example under discussion. The increase in distance resulting from the angular displacement restores valve 89, against the spring biasing force, to the intermediate or neutral position at which point further ram displacement terminates, as illustrated in broken lines in FIG. 9. If cable tensioning and relaxing means 84 is used to apply a tensioning force to cable 86, the procedure would be reversed, and pivoting of ram 24 in a downward direction about dowel 37 will cause the distance between cable end 97 and guide pulley 96 to shorten. Such shortening will allow the cable to pass around pulley 96 and permit valve 89 to be urged back to the intermediate or neutral position, at which point further displacement of the ram will be terminated.

The ram attitude control set forth herein obviates the need for multiple pulley structures such as is shown in my U.S. Pat. No. 3,181,407 in which the cable means is connected to the frame and the ram rather than the slide and the ram. In my earlier rake angle control the cable traveled a substantial distance over a plurality of pulleys since the ram was displaced a very substantial distance with respect to the frame during the stroke. In the rake angle control of the present invention the slide means travels with the ram during the stroke, and control is achieved by sensing the relative displacement between the ram and the slide means during a change in rake angle. This displacement can be small in the present invention, for example, as low as one-eighth of an inch in change in length of cable 86 will suffice for the full range of rake angles for most shear machines.

It is possible to position the tensioning and relaxing means 84 and pulley 96 lower on slide means 23 and farther away from dowel 37 to effect a greater change in length of cable 86 for any given rake angle change, if this is desired or necessary. It should be noted further that rake angle control 63 can be formed with valve assembly 83 mounted to slide 23 and tensioning and relaxing means 84 mounted to ram 24, though such reversal might render control somewhat less convenient.

In order to effect tensioning and relaxing of cable 86, it is a further feature of the present invention to form cable tensioning and relaxing means 84 with a threaded end 101 which is coupled to cable 86 by a shaft 102 dimensioned to pass through slide member 49 and terminating in a fitting 103 (FIG. 4) to which the cable is anchored.

Adjusting collar 106 is threadedly mounted on threaded end 101 and maintained in fixed relationship via a spacer collar 108 with a plate 107 secured to slide member 49.

The biasing spring 91 in valve assembly 83 tensions cable 86, which in turn applies a tension force to shaft 102, holding the adjusting collar 106 against the spacing collar 108 at all times.

Spacing collar 108 has an internal bore 109 dimensioned for free rotation of threaded end 101 therein.

Radially extending from the adjusting collar 106 to facilitate rotational movement of this collar is a handle 113.

It is preferable, in order to prevent undue twisting of cable 86 while rotating the adjusting collar to effect adjustments, to fix the threaded end 101 against rotation. This is accomplished by bolting the spacing collar 108 to the plate 107 and slidably keying the threaded end to the spacing collar by a keyway 114 and a key 116.

In operation, adjustments of the collar 106 in one direction function to apply a tensioning force to cable means 86 while generating a restoring force in the valve spring 91. Adjustments in the opposite direction tend to relax the cable, the valve spring then functioning to take up whatever slack would otherwise develop in the cable.

For further convenience of use, it is preferable that preselected and precalibrated rake angle settings be indicated by indicia or scale means 78 positioned adjacent the adjusting collar 106, with a pointer or similar indicator 119 inscribed on the adjusting collar so as to enable preselection of a desired rake angle.

Additionally, the adjusting collar is preferably formed to include indexing means in the form of appropriately spaced recesses 121 for sequential engagement by a cooperatively associated spring biased detent 122 installed in the proximate wall of the spacing collar.

I claim:

1. Rake angle and related stroke control for a machine such as a shear or the like wherein a pair of angularly relatable tool components cooperate to perform an operation on work, said rake angle and related stroke control comprising:
   means for adjusting the angular relationship between said angularly related tool components;
   stroke adjustment means for determining the extent of cooperation between said tool components in performing an operation on work; and
   relating means for associating said stroke adjustment means to the angular adjustment between said cooperating tool components to obtain a desired extent of cooperation at a desired angular relationship between said components;
   said relating means including graphical means mounted in proximity to said stroke adjustment means, said stroke adjustment means, said stroke adjustment means including adjustable stop means for determining the extent of cooperation between said tool component and an indicator carried by said adjustable stop means for movement over said graphical means to indicate the prevailing extent of cooperation between said tool components for any angular relationship therebetween and any position of said stop means.

2. A rake angle and related stroke control in accordance with claim 1, characterized by said graphical means being formed to graphically represent the length of cooperation of said tool components as a function of rake angle, and said indicator means cooperates with said graphical means to determine the depth of stroke required to obtain a desired length of cooperation between said tool components.

3. A rake angle and related stroke control in accordance with claim 2, characterized by said indicator means being formed as a transparent element having indicia thereon positioned for cooperation with said graphical means to determine the depth of stroke to obtain a desired length of cooperation between said tool components.

4. A rake angle and related stroke control in accordance with claim 1, characterized by said means for adjusting the angular relationship between said angularly related tool components including a rake angle control having a valve assembly, cable tensioning and relaxing means, and cable means coupling said valve assembly to said cable tensioning and relaxing means, said rake angle control being coupled to an angularly displaceable tool component of said angularly relatable tool components at a first point and at another point to a portion of said machine movable with said displaceable tool component and relative to which said displaceable tool component may be selectively angularly displaced, said cable means following a path which changes in length in response to angular displacement of said displaceable tool component.

5. A rake angle control for use with a machine such as a shear or the like having a frame, a ram assembly slidably supported with respect to said frame, said ram assembly including slide means and a ram mounted to said slide means for selective angular displacement to effect adjustment of the rake angle of said ram, and drive means operatively connected to slidably move said ram assembly, said drive means including a motor pivotally coupled to said ram assembly to enable angular displacement of said ram, said rake angle control comprising a valve assembly, cable tensioning and relaxing means, cable means coupling said valve assembly to said cable tensioning and relaxing means, said rake angle control being mounted on said ram assembly and coupled at one point to said ram and at another point to said slide means, said cable means following a path which changes in length in response to angular displacement of said ram, means mounted in proximity to said ram for cooperation with said ram upon sliding movement of said ram assembly to perform an operation on work, stroke adjustment means for determining the extent of sliding movement of said ram assembly, and means for relating said stroke adjustment means to the angular adjustment of said ram to obtain a desired extent of cooperation between said ram and said means mounted for cooperation with said ram at a desired angular adjustment of said ram.

* * * * *